Figure 1:
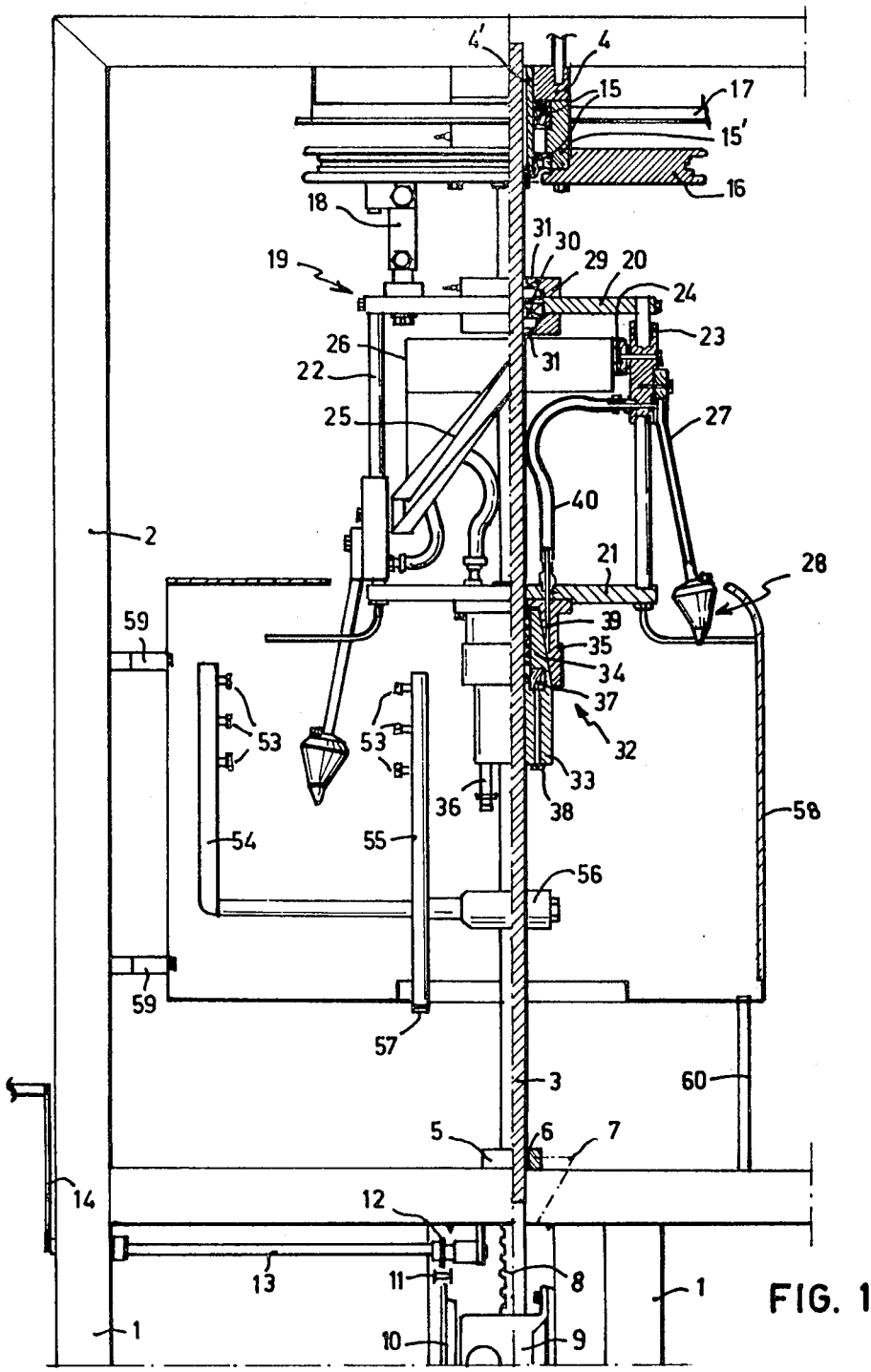

United States Patent [19]

Tieleman

[11] 4,421,277
[45] Dec. 20, 1983

[54] SPRAY HEAD, SUITED FOR INTERNALLY CLEANING SLAUGHTERED POULTRY

[76] Inventor: Rudolf J. Tieleman, Broekhuizerweg 6, 6983 BM Doesburg, Netherlands

[21] Appl. No.: 397,744

[22] Filed: Jul. 13, 1982

[51] Int. Cl.³ .............................................. B05B 1/32
[52] U.S. Cl. ................................. 239/456; 239/533.12
[58] Field of Search ............ 239/456, 459, 476, 533.12

[56] References Cited

U.S. PATENT DOCUMENTS

| | | | |
|---|---|---|---|
| 2,207,758 | 7/1940 | Rehse | 239/456 X |
| 3,045,926 | 7/1962 | Steinen | 239/476 X |
| 3,923,247 | 12/1975 | White | 239/456 X |

Primary Examiner—John J. Love
Assistant Examiner—Gene A. Church
Attorney, Agent, or Firm—Beveridge, DeGrandi and Kline

[57] ABSTRACT

Slaughtered poultry supported on the apparatus are internally cleaned by a spray head which is moved into the bodies of the birds. The spray head has a peripheral outlet slot defined by and located between a conical member and a truncated conical member which are threadedly interconnected. An axial delivery bore in the truncated conical member discharges directly into the outlet slot.

9 Claims, 2 Drawing Figures

SPRAY HEAD, SUITED FOR INTERNALLY CLEANING SLAUGHTERED POULTRY

The invention relates to a spray head, suited for internally cleaning slaughtered poultry, comprising two portions connected to each other by screw threads, at least one portion of which being provided with an axial bore for delivering cleaning liquid and between both portions a peripheral slot being delimited, which is connected to the axial bore and which is located in a plane perpendicular to the axis of at least one of the portions.

A similar spray head is known from U.S. patent specification No. 3,045,926. This known spray head comprises a sleeve-shaped portion and a T-shaped portion with a stem having screw thread, which is screwed to a stop in the sleeve-shaped portion. The stem of the T-shaped portion is at its free end provided with an axial bore, which via radial bores discharge into a ring-shaped space between the stem and the sleeve, which in its turn discharges into in the peripheral slot. In order to use this known spray head for internally cleaning slaughtered poultry, the spray head has to be surrounded by a basket of thick metal wire, at least three wires being mounted on a ring on the sleeve-shaped portion, said wires being inwardly folded beyond the head of the T-shaped portion and connected to each other in the conical top. This wire basket on the one side, is necessary to protect the interior of the poultry against damage by sharp edges at the spray head and at the other side to make an opening at the neck of the poultry by the wire basket, so that the cleaning liquid can flow away. A disadvantage of this known spray head is, that the cleaning liquid has to change its direction of flow over 90° for three times in succession, because of which the force of the spray is diminished, while the spray furthermore is interrupted at at least three points by the wires of the protection basket.

The invention has the object to abolish the disadvantages of this known spray head.

This object is reached, by that according to the invention the spray head comprises a truncated-conical portion and a conical portion and because the axial delivery bore in the truncated-conical portion discharges directly into the peripheral slot.

By application of these features it is reached that the cleaning liquid in the spray head will have to change its direction of flow only once and that the spray can be continuously active all around, because the spray head, thanks to its conical shape over its total length, does not have any sharp edges or other extending portions and therefore a protection basket is superfluous. Thanks to its conical shape the spray head according to the invention can be easily brought into an opening in the slaughtered poultry, without danger of damage. The cone base keeps the interior of the poultry wide open, so that the ring-shaped spray can work optimally all around and the top of the conical portion takes care of the discharge opening at the neck of the poultry.

Indeed the sleeve-shaped portion of the known spray head is partially truncated-conical, but this shape does not have any specific purpose and the effect of such a shape is nullified by the sharp edges of the T-shaped portion.

With a preferred embodiment of the spray head according to the invention the centre line of the truncated conical portion includes a sharp angle with the centre line of the conical portion.

By application of this feature it is possible, with a vertical movement of the spray head parallel to the centre line of the conical portion, to locate the spray in a horizontal plane, so that this can function in the best way.

With a very appropriate embodiment of the spray head according to the invention the width of the peripheral slot is adjustable. Because of that the thickness of the round spray and accordingly the force of the round liquid jet can be adjusted at the desired value.

Figure 2:
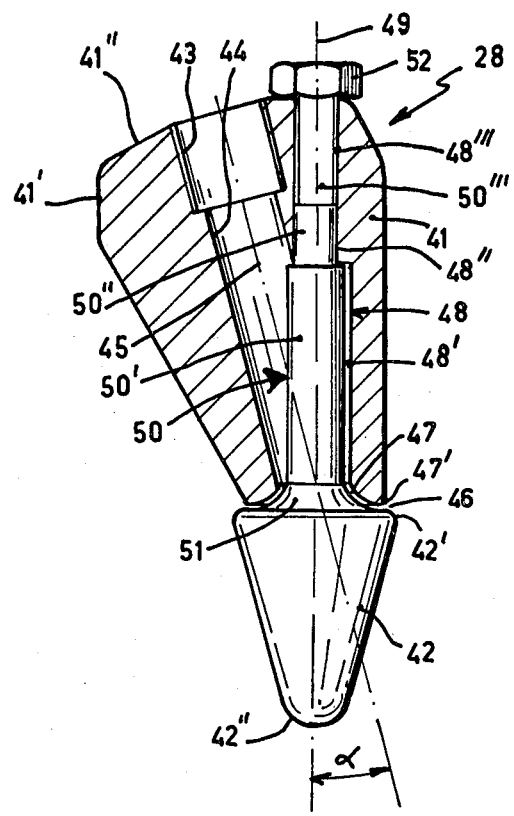

The invention will be elucidated in the following description taken in connection with the drawings, with one embodiment in which:

FIG. 1 is a partial side view and a partial vertical section of a device for internally cleaning slaughtered poultry, provided with a number of spray heads according to the invention and FIG. 2 is a partial longitudinal section and a partial side view of the spray head according to the invention.

The device which is drawn in FIG. 1, is provided with a rectangular frame 2 of square tubular material, supported by legs 1, in which a vertical stationary shaft 3 is supported. The shaft 3 is, at its upper end in the upper beam of the frame 2, supported by a slide bearing 4,4' and at its lower end in the lower beam of the frame 2 by a slide bearing 5, provided with a key 6, which can be pressed by a radial adjusting bolt 7. The shaft 3 is vertical adjustable in the frame 2 and is therefore provided with a tooth rack 8, which can be driven by a driving gear 9 having a chain wheel 10, which can be driven by a chain 11 and a chain pinion 12 on a drive shaft 13, which can be rotated by a crank 14.

On the bearing sleeve 4' is mounted a double conical roller bearing 15, on the outer ring 15' of which a chain wheel 16 is mounted. Over the chain wheel 16 runs a driven chain, in which the slaughtered poultry are suspended at their legs with the aid of hooks, which are guided by an upper rail 17 (not drawn).

The chain wheel 16 is connected to a guide-frame 19 by means of a vertical, longitudinally adjustable connection 18, said connection comprising a round upper plate 20, a round lower plate 21, and a number of pairs of guide rods 22. On each pair of guide rods 22 a slide 23 can be moved up and down, which at the inner side is provided with a guide roller 24, which is in engagement with a peripherally extending curve track 25, which is connected to a drum 26, is fixedly mounted onto the shaft 3. The curve track 25 is shaped in such a way that the slide 23, over a peripheral angle of ±150°, remais in its highest position (FIG. 1 at the right) and over the remaining peripheral angle of ±210° along the curve track, moves downwardly in its lowest position (FIG. 1 at the left), remains therein over a predetermined peripheral angle and then moves to its highest position again.

On the outer side of each slide an obliquely downwardly and outwardly directed delivery tube 27 is mounted, which at its free end is provided with a spray head 28 according to the invention, which will be described in greater detail hereinafter.

The upper plate 20 of the guide-frame 19 is mounted on the shaft with a hub 29, in which a bearing 30 and reversing rings 31 are mounted. The lower plate 21 of the guide-frame 19 is mounted on the shaft 3 with the aid of a delivery device 32 for the cleaning liquid, usually water, to which one or more additives can be added. The delivery device 32 comprises three hubs 33, 34 and 35, the lower hub 33 of which is provided with a junction nipple 36 on the water conduit, in which between the nipple 36 and the water conduit a pressure pump can be switched. The lower hub 33 is fixedly mounted on the shaft 3 and adjacent to the nipple 36 is provided with a bore extending parallel to the shaft 3, said bore discharges to an aligned bore in a tapered hub 34, which is provided with a peripheral slot over a peripheral angle, which is almost equal to and which coincides with the peripheral angle, over which the spray head 28 is vertically displaced during its circular movement. The tapered hub 34 engages a tapered bore of the upper hub 35, which is fixedly secured to the lower plate 21 of the guide-frame 19. The tapered hub 34 is secured against rotation with the upper hub 35 by a key 37 with an adjusting bolt 38 and the tapered hub is pressed in the tapered bore in the upper hub 35 by means of a pressure spring. Further in the upper hub 35 for each spray tube 27 a bore is made, which, via a bore and a nipple in the lower plate 21, is connected to a flexible hose 40, which at his turn is connected to a nipple at the inner side of the slide 23, which connects the hose 40 via a bore in the slide to the spray tube 27. Each time when a spray head 28, during its rotation movement, moves into its lowest position and again upwardly (FIG. 1 at the left) the bore 39 in the upper hub (35) is connected to the peripheral slot in the tapered hub 34 and thus with the delivery nipple 36 and the water flows through the bore 29, the hose 40 and the spray tube 27 to the spray head 28. The spray heads 28 move synchronously with the slaughtered poultry and are pressed in the body hole of the slaughtered poultry with the downward movement and start their cleaning action, when the spray heads 28 start to move toward their lowest position in the poultry.

The construction of the spray head according to the invention will now be described referring to FIG. 2.

The spray head 28 according to the invention comprises a truncated-conical portion 41 and a conical portion 42. The portion 41 is connected to the spray tube 27 by means of a screw threaded bore 43. The portion 41 is further provided with an axial delivery bore 44 for the the cleaning liquid, especially water, which just like the screw threaded bore 43 is coaxial with respect to the cone centre line 45. The axial delivery bore 44 discharge directly in a peripheral slot 46, which is delimited between the truncated-conical portion 41 and the conical portion 42. Thereby the transit 47 between the wall of the bore 44 and the smallest end plane of the portion 41 is radiused and the outer edge 47' of that end plane is sharp.

The truncated-conical portion 41 is at its largest end plane further still provided with an also truncated conical portion 41' shaped out of one piece therewith, which is oppositely tapered to and of which the end plane 41" is truncated-conically bevelled. The portion 41 is finally provided with a through-going stepped bore 48, the lower portion 48' of which, over a part of its periphery, is connected to the delivery bore 44 and discharges to the peripheral slot 46. The middle portion 48" has a precisely machined diameter and the upper portion 48'" is provided with an internal screw thread, the purpose of which will be elucidated hereinafter. The centre line 49 of the bore 48 includes a sharp angle $\alpha$ with the centre line 45 of the delivery bore 44, the purpose of which will also be elucidated hereinafter.

The conical portion 42 of the spray head 28 is provided with a shank 50, which is connected to the conical portion 42 with a horn-shaped widening portion 51 out of one piece. The shank 50 comprises a lower portion 50', which fits in the bore portion 48' with radial clearance, a middle portion 50" which precisely fits in the bore portion 48" and an upper portion 50'" provided with a screw thread, which is screwed in the bore portion 48'" and onto which a nut 52 is screwed. By rotating the conical portion 42 with respect to the portion 41 the width of the peripheral slot 46 can be adjusted. The nut 52 serves to fix both portions 41 and 42 with respect to each other and so to fix the width of the peripheral slot at a predetermined value.

The locking nut 52 engages the truncated conical end plane 41" of the portion 41. The outer peripheral edge 42' of the truncated portion 42 has a larger diameter than the smallest end plane of the portion 41 and is radiused and the conical top 42" is also radiused.

With the embodiment as drawn, the angle $\alpha$ is 15°. This angle is chosen in such a way that the centre line 49 of the conical portion 42, 50 comes to a vertical position, at least parallel to the centre lines of the guide rods 22 (FIG. 1). The spray tube 27 is located on the centre line 45 of the portion 41 and also includes an angle of 15° with the centre lines of the guide rods 22. With the embodiment as drawn twelve spray heads 28 have been used with the machine according to FIG. 1; whereby the angle $\alpha$ can be chosen larger and smaller respectively, depending on the extent of the vertical movement of the spray heads. Further with the embodiment as drawn the portions 41,41' and 42 have a top angle of 30° and the portion 41" a top angle of 150°.

The machine according to FIG. 1 is further provided with a number of spray nozzles 53, which serve to clean the outside of the slaughtered poultry. The spary nozzles 53 are mounted on delivery tubes 54,55 which are connected to each other in U-shape, are secured to the shaft 3 with a hub 56 and are connected to the water conduit with a nipple 57. The active portion of the machine is surrounded by a box 58, which is supported on the frame 2 with the aid of supports 59 and 60.

I claim:

1. Apparatus for internally cleaning slaughtered poultry, comprising, a spray head and means for moving the spray head forwardly into the body of a slaughtered bird which is supported on the apparatus to clean the bird internally, said spray head being formed of two portions connected to each other by screw threads, at least one said portion being provided with an axial bore for delivering cleaning liquid, said spray head having a peripheral outlet slot which is defined by and located between said portions, said peripheral outlet slot being connected to the axial bore and being located substantially in a plane which is perpendicular to the axis of at least one of the portions, characterized in that the spray head (28) comprises a truncated conical portion (41) and a conical portion (42), said conical portion and said truncated conical portion having exterior surfaces which converge toward the forward end of the nozzle, said axial delivery bore (44) being formed in the truncated-conical portion and discharging directly into the peripheral outlet slot (46).

2. Spray head according to claim 1, characterized in that the center line (45) of the truncated-conical portion (41) includes a sharp angle ( ) with the centre line (49) of the conical portion (42).

3. Spary head according to claim 1 or 2, characterized in that the width of the peripheral slot (46) is adjustable.

4. Spray head according to claim 2 characterized in that the centre line (45) of the axial bore (44) coincides with the centre line (45) of the truncated-conical portion (41) and that the sharp angle ( ) is 15°.

5. Spray head according to claim 1 or claim 2, characterized in that the largest diameter of the conical portion (42) on one side of the peripheral slot (46) is larger than the smallest diameter of the truncated-conical portion (41) on the other side of the peripheral slot (46).

6. Spray head according to claim 1 or claim 2, characterized in that the conical portion (42) is provided with a stem (50) extending through a bore (48) in the truncated-conical portion (41); said stem having a lower portion, a middle portion and a screw threaded portion; said bore having a lower portion, a middle bore portion and a screw threaded portion; said lower portion of the stem fitting with radial clearance in said lower bore portion (48'), said middle portion (50'') of the stem fitting closely in said middle bore portion (48''), and said screw threaded portion (50''') of the stem being screwed in said screw threaded portion (48''') of said bore (48), said screw threaded portion of the stem extending outwardly from the truncated-conical portion (41), and a locking nut (52) screwed on said screw threaded portion of the stem.

7. Spray head according to claim 1 or claim 2, characterized in that the truncated-conical portion (41) has a rear end which is bevelled in a direction which diverges toward the forward end of the nozzle, said truncated conical portion (41) having a forward end which is sharp adjacent the peripheral slot (46), said conical portion having a convexly radiussed outer peripheral edge (42') and a concavely radiussed surface (42'') which faces the forward end of the truncated-conical portion.

8. A spray head according to claim 1 wherein the axial bore and the truncated conical portion have coincident center lines, said conical portion having a center line which is disposed at an angle of about 15° relative to the center line of the truncated conical portion, said conical portion having, on one side of the slot, a larger diameter than the smallest diameter of the truncated conical portion on the other side of the slot.

9. Apparatus for internally cleaning slaughtered poultry, comprising, a spray head and means for moving said spray head forwardly into the body of a slaughtered bird which is supported on the apparatus to clean the bird internally, said spray head being provided with a truncated conical member having an axial liquid delivery bore therein, said bore having an outlet end, a conical member located at the outlet end of the bore and being axially spaced from the end of the truncated conical member to provide a peripheral outlet slot between said members, said conical portion and said truncated conical portion having exterior surfaces which converge toward the forward end of the nozzle, said peripheral outlet slot being located substantially in a plane which is perpendicular to the axis of at least one of the members, said members being connected together by screw threads.

* * * * *